US010305878B2

(12) United States Patent
Bao et al.

(10) Patent No.: US 10,305,878 B2
(45) Date of Patent: May 28, 2019

(54) VIRTUAL DEVICE AUTHORIZATION METHOD AND DEVICE

(71) Applicant: HIERSTAR(SUZHOU)., LTD., Wujiang, Suzhou, Jiangsu (CN)

(72) Inventors: Wenbin Bao, Suzhou (CN); Taoling Xie, Suzhou (CN); Yehong Li, Suzhou (CN); Xiaolong Jia, Suzhou (CN)

(73) Assignee: HIERSTAR (SUZHOU)., LTD., Suzhou (CN)

( * ) Notice: Subject to any disclaimer, the term of this patent is extended or adjusted under 35 U.S.C. 154(b) by 404 days.

(21) Appl. No.: 15/102,137

(22) PCT Filed: Oct. 23, 2014

(86) PCT No.: PCT/CN2014/089225
§ 371 (c)(1),
(2) Date: Jul. 26, 2016

(87) PCT Pub. No.: WO2015/081763
PCT Pub. Date: Jun. 11, 2015

(65) Prior Publication Data
US 2016/0359832 A1    Dec. 8, 2016

(30) Foreign Application Priority Data

Dec. 6, 2013  (CN) .......................... 2013 1 0653256

(51) Int. Cl.
*H04L 29/06* (2006.01)
*H04L 9/32* (2006.01)
(Continued)

(52) U.S. Cl.
CPC ............ *H04L 63/08* (2013.01); *H04L 9/0643* (2013.01); *H04L 9/0863* (2013.01);
(Continued)

(58) Field of Classification Search
CPC ..... H04L 63/08; H04L 9/3228; H04L 9/0863; H04L 9/0643; H04L 63/10; H04L 63/0846; H04L 9/3263; H04W 12/06; H04W 12/08
(Continued)

(56) References Cited

U.S. PATENT DOCUMENTS 8,739,257 B1 * 5/2014 Robinson ................ G06F 21/44
713/168
8,799,997 B2 * 8/2014 Spiers ................. H04L 63/0218
726/3
(Continued)

FOREIGN PATENT DOCUMENTS

| CN | 101754466 | 6/2010 |
|---|---|---|
| CN | 102103778 | 6/2011 |
| CN | 102187353 | 9/2011 |

*Primary Examiner* — Saleh Najjar
*Assistant Examiner* — Feliciano S Mejia
(74) *Attorney, Agent, or Firm* — Baker, Donelson, Bearman, Caldwell & Berkowitz, PC

(57) ABSTRACT

The present invention discloses a method and a device for authorizing and using a virtual device, wherein the method comprises: after receiving a request for generating a virtual device, a mobile terminal configures authority information of a first virtual device, generates the first virtual device, and interacts with a servers to send the configured authority information of the first virtual device and related authentication information to the server for authenticating. After passing the authentication, the server generates a second virtual device with the above-mentioned authority information. When in use, the mobile terminal generates authentication information and sends a current use status of the first virtual device to the server for authenticating and is returned to with a authentication result. The present invention improves the security by adding the authentication with (Continued)

respect to the authority information during the authorization of generating the virtual device and use of the virtual device.

11 Claims, 3 Drawing Sheets

(51) Int. Cl.
 *H04L 9/06* (2006.01)
 *H04L 9/08* (2006.01)
 *H04W 12/06* (2009.01)

(52) U.S. Cl.
 CPC .......... *H04L 9/3228* (2013.01); *H04L 9/3263* (2013.01); *H04L 63/0846* (2013.01); *H04L 63/10* (2013.01); *H04W 12/06* (2013.01)

(58) Field of Classification Search
 USPC .................................. 709/202, 203; 713/156
 See application file for complete search history.

(56) References Cited

U.S. PATENT DOCUMENTS

| | | | | |
|---|---|---|---|---|
| 9,247,042 B2* | 1/2016 | Deasy | .................... | H04W 76/10 |
| 9,313,026 B2* | 4/2016 | Li | .......................... | H04L 9/3066 |
| 9,804,866 B2* | 10/2017 | Halls | ........................ | G06F 21/83 |
| 9,818,097 B2* | 11/2017 | Hwang | ................. | G06Q 20/045 |
| 9,953,310 B2* | 4/2018 | Smith | ................. | G06Q 20/3227 |
| 2009/0043647 A1* | 2/2009 | Hwang | ................ | G06Q 20/045 |
| | | | | 705/13 |
| 2012/0226740 A1* | 9/2012 | Nath | ..................... | H04L 67/125 |
| | | | | 709/203 |
| 2013/0275376 A1* | 10/2013 | Hudlow | .................. | H04L 67/34 |
| | | | | 707/639 |
| 2013/0275973 A1* | 10/2013 | Greenfield | .......... | G06F 9/44584 |
| | | | | 718/1 |
| 2013/0346305 A1* | 12/2013 | Mendes | ............... | G06Q 20/351 |
| | | | | 705/41 |
| 2013/0347064 A1* | 12/2013 | Aissi | ....................... | G06F 21/30 |
| | | | | 726/2 |

* cited by examiner

US 10,305,878 B2

VIRTUAL DEVICE AUTHORIZATION METHOD AND DEVICE

CROSS REFERENCE TO RELATED APPLICATIONS

This application is a § 371 National State Application of PCT/CN2014/089225 filed Oct. 23, 2014 which claims priority to CN 201310653256.8 filed Dec. 12, 2013, which are hereby incorporated by reference in their entirety.

TECHNICAL FIELD

The present invention relates to the virtual device field, and in particular, to a method and a device for authorizing and using of a virtual device on which privileges can be set.

BACKGROUND

At present, the modes for shopping payment mainly have two kinds, one is utilizing a physical card, i.e. an entity bank card, which possesses high security, however, it is likely to be missed or lost when used in various occasions, and can not be used at the same time at multi-locations or by multi-users. The second kind is using a pure virtual card, which is convenient to use, however, with a very low security due to that the transaction verification is completed only by information such as card number, period of validity, verification code and the like, and that passwords and other information are likely to be leaked during network propagation.

There are similar situations existing in other areas, such as the use of access cards. The entity access card, as the entity bank card, possesses high security, but needs to be carried always, and in this way it is easy to be lost. If using pure virtual cards, for example by embedding the relevant identity information into a smart phone, the smart phone can be utilized to open the door access. Although it is easy to use, similarly, it has a relatively low security.

SUMMARY

The present invention is intended to provide a method and a device for authorizing and using a virtual device, to improve the security during the authorization and the use of the virtual device.

On the basis of the above purposes, the embodiments of the present invention provide a method of authorizing and using a virtual device, comprising:

a mobile terminal receives a request for generating a first virtual device sent by a first device, the request for generating the first virtual device comprising an identifier of the first device and first authentication information; the mobile terminal is installed with a virtual device terminal software;

the mobile terminal receives authority information of the first virtual device input by a user;

the mobile terminal generates the first virtual device and the server generates a second virtual device;

when receiving a use request input by a user, the mobile terminal generates second authentication information and sends the use request and the second authentication information to the server; the use request comprises a current use status of the first virtual device and the identifier of the first virtual device;

the server finds the corresponding second virtual device according to the identifier of the first virtual device, authenticates the second authentication information and the use request according to the corresponding second virtual device, and sends an authentication result to the mobile terminal, in order that the mobile terminal performs next step according to the authentication result;

wherein, the mobile terminal generating the first virtual device comprises: a mobile terminal generates the identifier of the first virtual device according to the identifier of the first device, and generates the first virtual device according to the identifier of the first virtual device and the authority information of the first virtual device;

the server generating the second virtual device comprises:

the server receives a request for generating the second virtual device sent by the mobile terminal; the request for generating the second virtual device comprises the identifier of the first device, the first authentication information and the authority information of the first virtual device, and the server authenticates the first authentication information and the authority information of the first virtual device in the request for generating the second virtual device according to the identifier of the first device, authority information of the first device and related authentication information of the first device stored in the server itself, if passing the authentication, the server generates an identifier of the second virtual device according to the identifier of the first device, generates the second virtual device according to the identifier of the second virtual device and the authority information of the first virtual device, and associatively stores the second virtual device with the first device.

Preferably, the mobile terminal receiving the request for generating the first virtual device sent by the first device comprises:

the mobile terminal interacts with a physical device, and receives the request for generating the first virtual device from the physical device;

or, the mobile terminal communicates with another mobile terminal having generated a third virtual device, and receives the request for generating the first virtual device from the another mobile terminal.

Preferably, the method of authorizing the generation of the virtual device and using the virtual device is authenticated by PKI.

Preferably, the method of authorizing the generation of the virtual device and using the virtual device is authenticated by dynamic password; the method comprises:

the mobile terminal interacts with the first device to obtain the request for generating the first virtual device comprising the identifier of the first device, a first dynamic password and a secret key of the first virtual device; the first dynamic password is obtained by encrypting a secret key of the first device and a dynamic factor by the first device; the secret key of the first virtual device is obtained by encrypting the secret key of the first device by the first device;

the mobile terminal receives authority information of the first virtual device input by a user;

a mobile terminal generates the identifier of the first virtual device according to the identifier of the first device, and generates the first virtual device according to the identifier of the first virtual device, the secret key of the first virtual device and the authority information of the first virtual device;

the mobile terminal sends the request for generating the second virtual device to the server; the request for generating the second virtual device comprises the identifier of the first device, the first dynamic password and the authority information of the first virtual device;

the server authenticates the first dynamic password and the authority information of the first virtual device in the request for generating the second virtual device according to the identifier of the first device, the authority information of the first device and the secret key of the first device stored in the server itself;

if passing the authentication, the server generates the identifier of the second virtual device according to the identifier of the first device, and encrypted generates the secret key of the second virtual device according to the secret key of the first device;

the server generates the second virtual device according to the identifier of the second virtual device, the secret key of the second virtual device and the authority information of the first virtual device, and associatively stores the second virtual device with the first device;

when receiving a use request input by a user, the mobile terminal generates a second dynamic password according to the secret key of the first virtual device and sends the use request and the second dynamic password to the server; the use request comprises a current use status of the first virtual device and the identifier of the first virtual device; the current use status of the first virtual device corresponds to the authority information of the first virtual device;

the server finds the corresponding second virtual device according to the identifier of the first virtual device, authenticates the second dynamic password and the use request according to the corresponding second virtual device, and sends an authentication result to the mobile terminal, in order that the mobile terminal performs next step according to the authentication result.

Preferably, the request for generating the first virtual device further comprises a random code;

the secret key of the first virtual device is hashing generated according to the secret key of the first device and the random code by the first device via a SM3 cryptographic hashing algorithm;

the request for generating the second virtual device further comprises a random code;

if passing the authentication, the server hashing generates the secret key of the second virtual device according to the secret key of the first device and the random code via the SM3 cryptographic hashing algorithm.

Preferably, the authority information comprises at lease one of time, class and limit, and the current use status of the first virtual device comprises at lease one of current use time, use class and use limit of the first virtual device.

The embodiments of the present invention further provide a device of authorizing and using a virtual device, which comprises a mobile terminal and a server;

the mobile terminal is to receive a request for generating a first virtual device sent by a first device and authority information of the first virtual device input by a user, generate an identifier of the first virtual device according to an identifier of the first device, generate the first virtual device according to the identifier of the first virtual device and the authority information of the first virtual device and send a request for generating a second virtual device to the server; the request for generating the first virtual device comprises the identifier of the first device and an first authentication information; the mobile terminal is installed with a virtual device terminal software; the request for generating the second virtual device comprises the identifier of the first device, the first authentication information and the authority information of the first virtual device;

the mobile terminal further is to, when receiving a use request input by a user, generate second authentication information, send the use request and the second authentication information to the server and perform next step according to an authentication result returned by the server; the use request comprises a current use status of the first virtual device and the identifier of the first virtual device;

the server is to authenticate the first authentication information and the authority information of the first virtual device in the request for generating the second virtual device according to the identifier of the first device, the authority information of the first device and the related authentication information of the first device stored in the server itself, and when passing the authentication, to generate an identifier of the second virtual device according to the identifier of the first device, generate the second virtual device according to the identifier of the second virtual device and the authority information of the first virtual device, and associatively store the second virtual device with the first device;

the server further is to find a corresponding second virtual device according to the identifier of the first virtual device, authenticate the second authentication information and the use request according to the corresponding second virtual device, and send an authentication result to the mobile terminal.

Preferably, the mobile terminal is to interact with a physical device, and acquire the request for generating the first virtual device from the physical device;

or, the mobile terminal is to communicate with another mobile terminal having generated a third virtual device, and acquire the request for generating the first virtual device from the another mobile terminal.

Preferably, the mobile terminal and the server complete the authorization generation and the use of the virtual devices by means of PKI.

Preferably, the mobile terminal and the server complete the authorization generation and the use of the virtual devices by means of dynamic password;

the mobile terminal is to receive a request for generating the first virtual device of the first device and the authority information of the first virtual device input by a user, generate the identifier of the first virtual device according to the identifier of the first device, generate the first virtual device according to the identifier of the first virtual device, a secret key of the first virtual device and the authority information of the first virtual device, and send the request for generating the second virtual device to the server; the request for generating the first virtual device comprises the identifier of the first device, the first dynamic password and the secret key of the first virtual device; the first dynamic password is obtained by encrypting a secret key of the first device and dynamic factor by the first device; the secret key of the first virtual device is obtained by encrypting the secret key of the first device by the first device; the request for generating the second virtual device comprises the identifier of the first device, the first dynamic password and the authority information of the first virtual device;

the mobile terminal further is to, when receiving a use request input by a user, generate a second dynamic password, send the use request and the second dynamic password to the server, and perform next step according to an authentication result returned by the server; the use request comprises a current use status of the first virtual device and the identifier of the first virtual device; the current use status of the first virtual device corresponds to the authority information of the first virtual device;

the server is to authenticate the first dynamic password and the authority information of the first virtual device in the request for generating the second virtual device according to the identifier of the first device, the authority information of the first device and the secret key of the first device stored in the server itself; and when passing the authentication, to generate an identifier of the second virtual device according to the identifier of the first device, generate the second virtual device according to the identifier of the second virtual device, the secret key of the second virtual device and the authority information of the first virtual device, and associatively store the second virtual device with the first device;

the server is further to find a corresponding second virtual device according to the identifier of the first virtual device, authenticate the second dynamic password and the use request according to the corresponding second virtual device, and send an authentication result to the mobile terminal.

Preferably, the authority information comprises at lease one of time, class and limit, and the current use status of the first virtual device comprises at lease one of current use time, use class and use limit of the first virtual device.

The beneficial effects of the present invention are:

By installing the virtual device terminal software on the mobile terminal, and authorizing the generation of a virtual device with certain authority limits (time, class, limit) on the mobile terminal which interacts with and authenticates with a server during the authorization process and the use process, the present invention is convenient for use and enhances the security. Moreover, the present invention can immediately generate a virtual device by swiping card at the virtual device terminal software, which process is convenient and secure. When authenticating with the server (both in the processes of authorizing the generation of the virtual device and of using the virtual device), it can support the dynamic password technology, PKI technology and the like; moreover, when employing the dynamic password technology, the secret keys are hashing generated in the server and the first device and are not transmitted in network, which further enhance the security. In addition, the virtual device with relevant authority in the present invention may also authorize the generation of a new virtual device.

DETAILED DESCRIPTION OF EMBODIMENTS

In the following, the technical schemes in the embodiments of the present invention are explained clearly and fully combining with the accompanying drawings, and apparently, the described embodiments are merely a part of the embodiments of the present invention, not all of the embodiments. Based on the embodiments of the present invention, all other embodiments obtained by one of ordinary skill in the art without creative work belong to the scope protected by the present invention.

Embodiment 1

Figure 1:
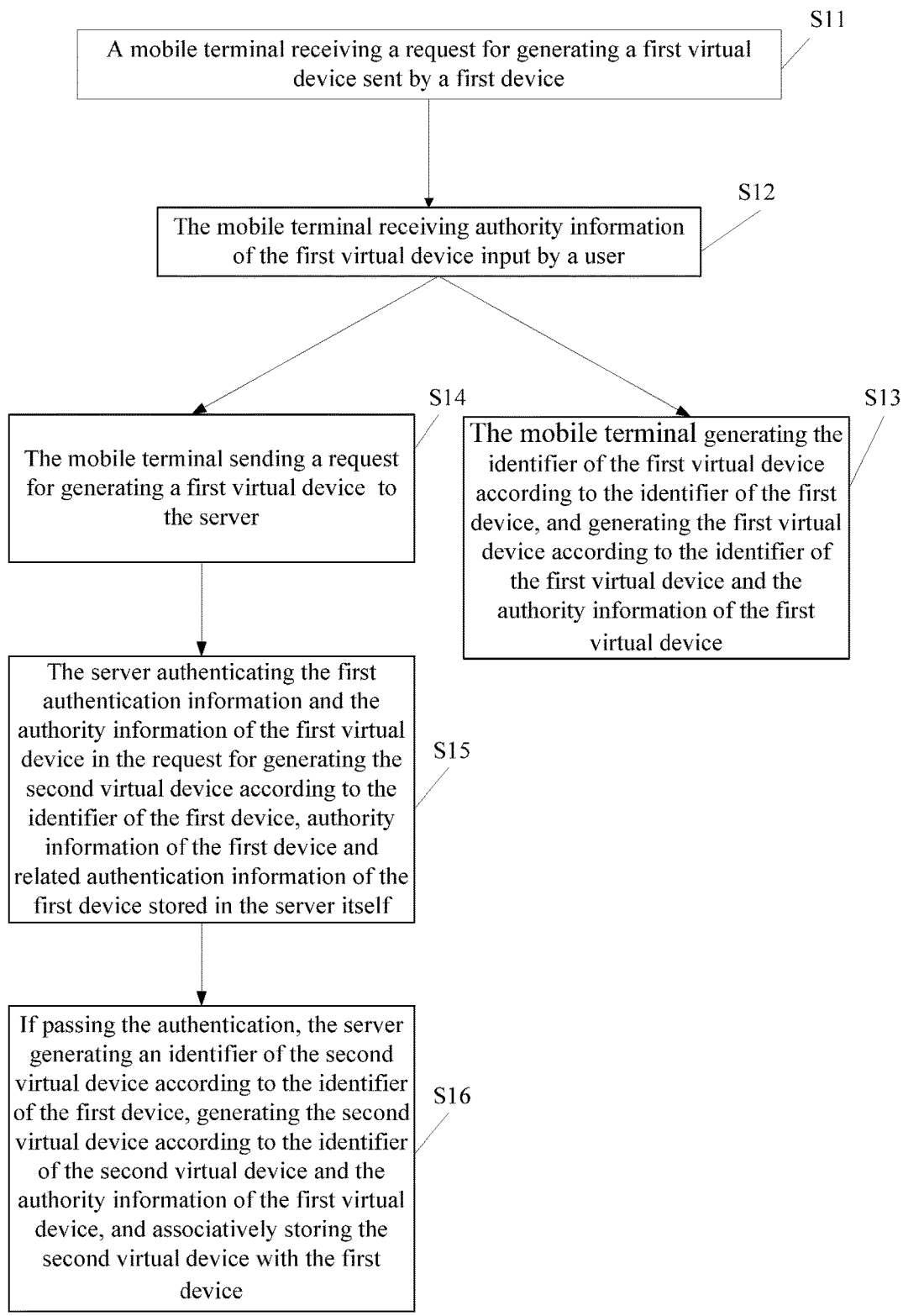
FIG. 1 is a flow chart of authorizing the generation of a virtual device according to the present invention.

Embodiment 1 of the present invention provides a method of authorizing and using a virtual device, the method specifically comprising a process of authorizing the generation of the virtual device, and a process of using the virtual device to perform relative operations such as payment or open a door access. Both the two processes are needed to be authenticated between a mobile terminal and a server. In addition to identity authentication information, the method further adds an authentication of authority information. A user sets a using authority of the virtual device on the mobile terminal, and then sends to the server for authenticating. If passing the authentication, that is, the set using authority of the virtual device is within the authority limit of a first device, the virtual device is authorized to be generated on the server. When in use, the mobile terminal sends a current use status of the virtual device to the server for authenticating, and if the current use status corresponds to the authority limit of the first device, the authentication successes. In order to achieve the above method, the present invention needs to deploy an operation platform for authorizing the generation of the virtual device, that is, provide a server, in which information such as a device identifier, a secret key of the device, authority information of the device and etc. is stored in advance for authentication. The mobile terminal is required to be installed with a virtual device terminal software, and offer a physical device with OTP (One-time Password, dynamic password) function or PKI (Public Key Infrastructure). After finishing the above preparation, it is needed to authorize the generation of the virtual device in the mobile terminal and the server. Referring to FIG. 1, steps for authorizing the generation of a virtual device are as follow:

S11, the mobile terminal receives a request for generating a first virtual device sent by a first device. Wherein, the request for generating the first virtual device comprises the identifier of the first device and an first authentication information; the mobile terminal is installed with a virtual device terminal software.

The above mentioned first device can be a physical device, for example a physical card, in particular an entity bank card, door access and the like, and the identifier thereof can be a bank card number or serial number and the like. The mobile terminal interacts with the physical device, and acquires the request for generating the first virtual device from the physical device.

The above first device also may be a third virtual device provided on another mobile terminal, such as a virtual bank card or a virtual door access on a mobile phone, and the identifier thereof may be the card number of the virtual bank card or a serial number. The mobile terminal communicates with the another mobile terminal provided with the third virtual device, and receives the request for generating the first virtual device from the another mobile terminal.

In order to enhance the security, the present invention limits the authority of the virtual device which can authenticate the generation of virtual device, i.e., only a virtual device with certain authority may authenticate the generation of virtual device.

The first device is not limited to a card, and the present invention does not specifically limit the form of the first device.

The first authentication information is information for identity authentication, in particular, may be authentication information generated by dynamic password manner or PKI manner. In the following the authentication manner of dynamic password is detailed introduced.

S12, the mobile terminal receives authority information of the first virtual device input by a user.

The authority information varies according to the first device. For example, for a bank card, it can be use time, limit, class, etc., and for a door access, it can be use time, number of times, door types which may be opened by the door access, and the like.

The user may manually input desired authority information of the first virtual device. Due to that the authority information of the virtual device have to be within the authority limit of the first device, therefore, in a preferable embodiment of the present invention, the mobile terminal may further acquire the authority information of the first device and presents it on the mobile terminal so that the user can input according to this information and the success rate of authorizing the generation of the virtual device is increased.

S13, the mobile terminal generates the identifier of the first virtual device according to the identifier of the first device, and generates the first virtual device according to the identifier of the first virtual device and the authority information of the first virtual device.

The mobile terminal may generate the identifier of the first virtual device by employing an encryption algorithm on the identifier of the first device. Specifically, it may employ a SM3 cryptographic hashing algorithm.

In a specific embodiment, the identifier of the first virtual device may be the same with the identifier of the first device.

S14, the mobile terminal sends the request for generating the second virtual device to the server; the request for generating the second virtual device comprises the identifier of the first device, the first authentication information and the authority information of the first virtual device.

S15, the server authenticates the first authentication information and the authority information of the first virtual device in the request for generating the second virtual device according to the identifier of the first device, the authority information of the first device and the related authentication information of the first device stored in the server itself.

The server firstly finds a corresponding identifier in its own data base according to the identifier of the first device, and acquires the authentication information and the authority information related to the corresponding identifier.

The server then authenticates the first authentication information and the authority information of the first virtual device according to the authentication information and the authority information of its own.

Specifically, whether the use time, the use limit and the use class provided on the first virtual device are within the ranges of the use time, the use limit and the use class of the first device is authenticated, and if so, the authentication successes.

The above authentication may employ a dynamic password or PKI manner.

S16, if passing the authentication, the server generates an identifier of the second virtual device according to the identifier of the first device, generates the second virtual device according to the identifier of the second virtual device and the authority information of the first virtual device, and associatively stores the second virtual device with the first device.

The server may generate the identifier of the second virtual device by employing an encryption algorithm on the identifier of the first device. Specifically, it may employ a SM3 cryptographic hashing algorithm.

If the authentication does not success, the request for generating the second virtual device is refused.

In a specific embodiment, the identifier of the second virtual device may be the same with the identifier of the first device.

It should be noted that, the order of the reference numbers of the above steps is only one of the orders of the present invention, and may further comprise all other possible orders defined by text. For example, Step S13 may be excuted after Step S16.

Figure 2:
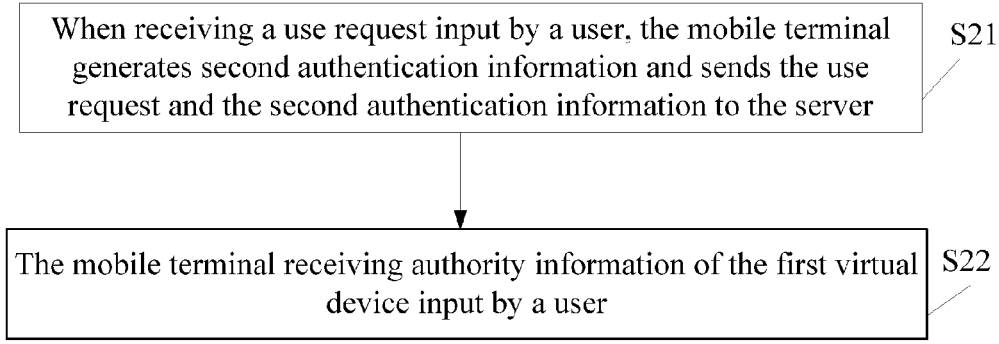
FIG. 2 is a flow chart of using the virtual device of the present invention.

After generating the virtual devices in the mobile terminal and the server, the mobile terminal may use the virtual device. Referring to FIG. 2, steps for using the virtual device are as follow:

S21, when receiving a use request input by a user, the mobile terminal generates second authentication information and sends the use request and the second authentication information to the server; the use request comprises a current use status of the first virtual device and the identifier of the first virtual device.

The user inputs or selects a corresponding identifier via the mobile terminal to designate the first virtual device to be used, and then sends the use require and the second authentication information to the server. Wherein, the use request comprises a current use status of the first virtual device, for instance, the current use time, number of use times, use class and the used amount, etc.

S22, the server finds the corresponding second virtual device according to the identifier of the first virtual device, authenticates the second authentication information and the use request according to the corresponding second virtual device, and sends an authentication result to the mobile terminal, in order that the mobile terminal performs next step according to the authentication result.

The above authentication may employ a dynamic password or PKI manner.

As above mentioned, both the identifier of the first virtual device and the identifier of the second virtual device are correspond to the identifier of the first device, therefore, the server may find out the second virtual device according to the identifier of the first virtual device, and then authenticate according to the authentication information and the authority information stored by the second virtual device itself, and returns an authentication result to the mobile terminal.

In the above embodiment, in order to further enhance the security, a random code may be sent to the mobile terminal via the first device, and then to the server via the mobile terminal. In this way, the mobile terminal and the server may hashing generate the identifier of the first virtual device and the identifier of the second virtual device according to the identifier of the first device and the random code via the SM3 cryptographic hashing algorithm.

It should be noted that, the use process of the virtual card, i.e. Step S21 and Step S22 after authorizing the generation of the virtual card may repeat.

The present invention provides the authentication for authority information during authorizing the generation of the virtual device and using the virtual device, and enhances the security compared with the prior art.

Moreover, in the present invention, the first virtual device and the mobile terminal are bound, and if required to use in another mobile terminal, a virtual device is required to be authenticated and generated in the another mobile terminal. This manner also improves the use security of the virtual device.

Embodiment 2

Figure 3:
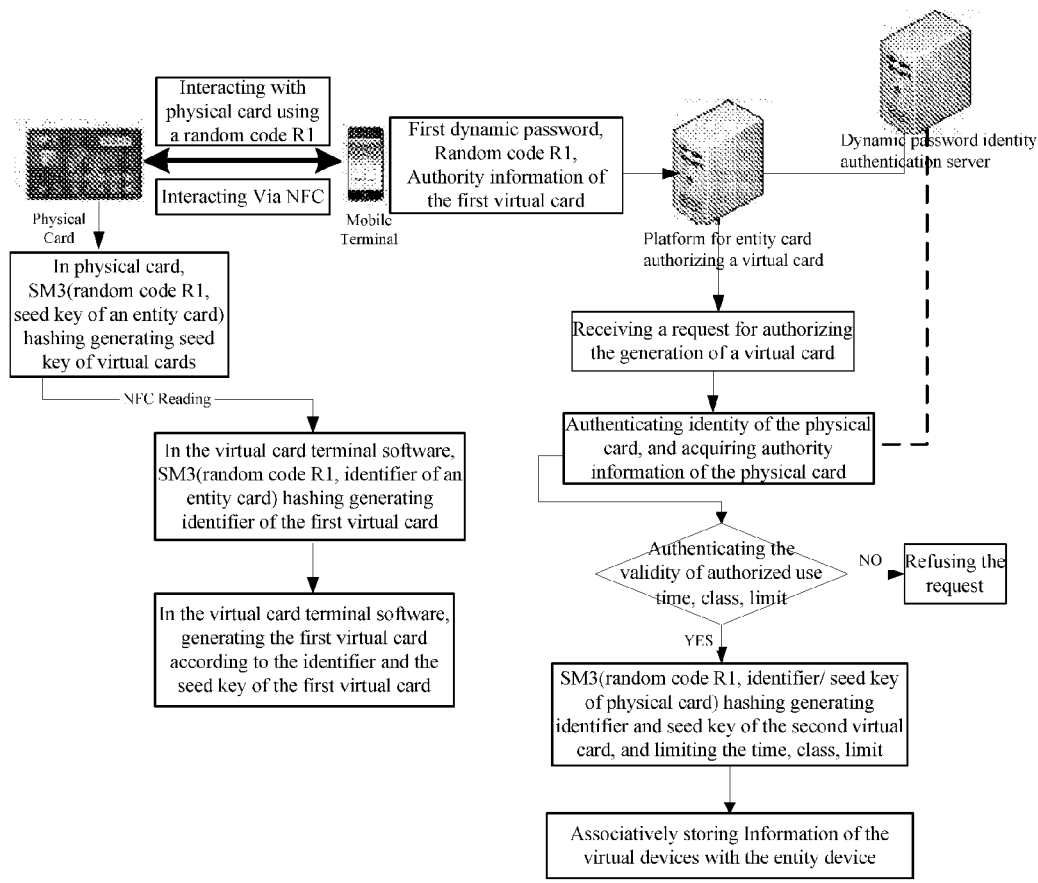
FIG. 3 is a flow chart of authorizing the generation of a virtual card of the present invention by using dynamic password.

The present invention detailed introduces the authorization process of the generation of a virtual card by a physical card by means of a dynamic password manner via the Embodiment 2, as shown in FIG. 3, the process comprises:

Firstly, the physical card interacts with a mobile terminal, and acquires a request for generating a first virtual card. The request for generating the first virtual device comprises the identifier of the physical card, a first dynamic password and a secret key of the first virtual card. The mobile terminal may specifically acquire the identifier of the physical card and the first dynamic password generated within the physical card by a manner of manually inputting, two-dimension code recognizing or NFC (Near Field Communication) reading. In this manner, the physical card has a function of generating dynamic passwords. When employing the NFC manner, etc., the user only needs to swipe the physical card at a relevant position.

Then, the mobile terminal receives authority information of the first virtual device input by the user. The authority information may be at lease one of authorized time, authorized limit (such as a maximum limit) and authorized class.

After that, the mobile terminal generates the identifier of the first virtual card according to the identifier of the physical card, and generates the first virtual card according to the identifier of the virtual card, the secret key of the first virtual card and the authority information of the first virtual card. The process may be automatic triggered based on the generation of the first virtual card, and also may be triggered when receiving a command input by a user. It is not specifically limited herein.

The mobile terminal also sends the request for generating the second virtual card to the server; the request for generating the second virtual card comprises the identifier of the physical card, a first dynamic password and the authority information of the first virtual card. The request for generating the second virtual card may be automatic triggered after the mobile terminal receives the request for generating the first virtual card, and also may be triggered after the user inputs a relevant command.

After receiving the request for generating the second virtual card, the server authenticates the first dynamic password and the authority information of the first virtual card in the request for generating the second virtual card according to the identifier of the physical card, the authority information of the physical card and the secret key of the physical card stored by the server itself. In the process of authentication, the server may authenticate the first dynamic password according to the secret key of the physical card stored by itself, and if passing the authentication, then authenticate the authority information in the received request for generating the second virtual card according to the authority information of the corresponding physical card stored by itself to verify the validity.

If passing the authentication, the server generates the identifier of the second virtual card according to the identifier of the physical card, and encrypted generates the secret key of the second virtual card according to the secret key of the physical card. If the authentication does not success, the server refuses to generate the second virtual card.

After that, the server generates the second virtual card according to the identifier of the second virtual card, the secret key of the second virtual card and the authority information of the first virtual card, and associatively stores the second virtual card with the physical card. For example, one-to-one correspondence between the identifier of the second virtual card and the identifier of the physical card is set.

In a specific embodiment of the present invention, in order to enhance the security, the identifier of the first virtual card and the identifier of the second virtual card may be generated from the identifier of the physical card and a random code via a encryption algorithm, and the secret key of the first virtual card and the secret key of the second virtual card may be hashing generated from the secret key of the physical card and a random code via a encryption algorithm, such as a SM3 cryptographic hashing algorithm. Wherein, the random code may be sent from the physical card to the mobile terminal and then sent from the mobile terminal to the server.

In a specific embodiment of the present invention, the first dynamic password may be cryptographically generated by a dynamic factor and the secret key of the physical card. The dynamic factor may be the current time or the current time with the addition of an identifier which is known to certain frond ends or back ends. Specifically, the encryption algorithm may employ the above SM3 cryptographic hashing algorithm.

It should be noted that, the encryption algorithm used by the physical card corresponds to the encryption algorithm used on the server to authenticate the first dynamic password, so as to ensure the server performs a correct authentication.

After generating the virtual devices in the mobile terminal and the server, the mobile terminal may use the virtual card.

Figure 4:
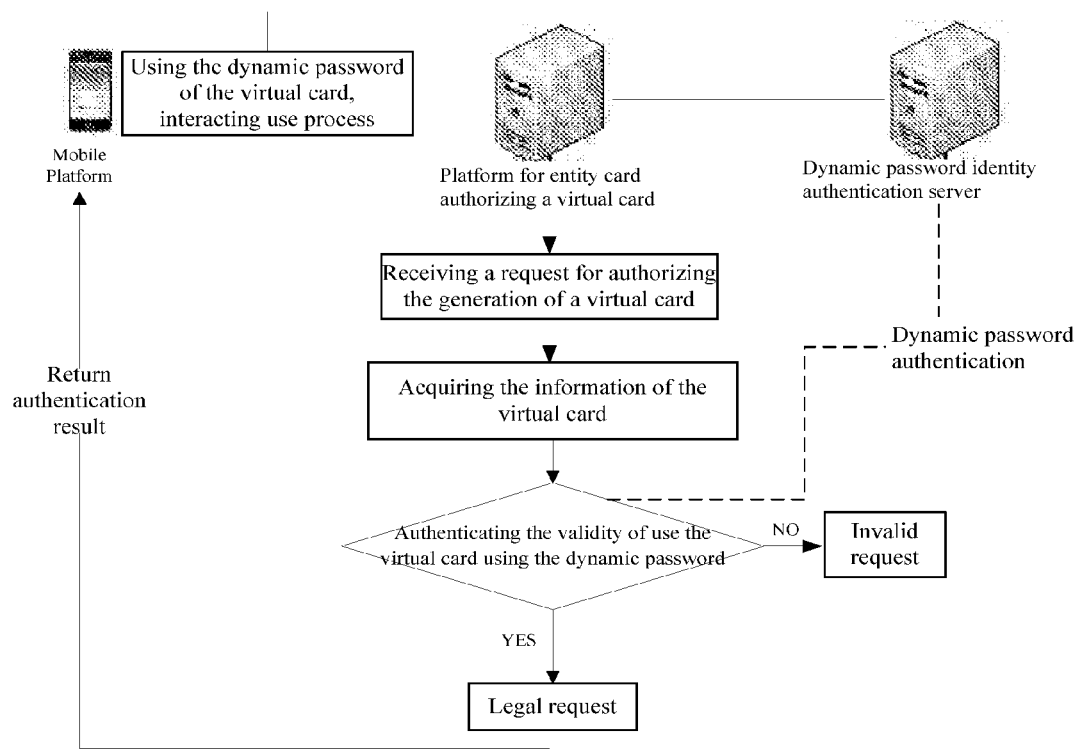
FIG. 4 is a flow chart of using the virtual card of the present invention by using dynamic password.

Follow to the above embodiment, the process of using the virtual card is explained, as shown in FIG. 4, the process comprises:

when receiving a use request input by a user, the mobile terminal generates a second dynamic password according to the secret key of the first virtual card and sends the use request and the second dynamic password to the server; the use request comprises a current use status of the first virtual card and the identifier of the first virtual card; the current use status of the first virtual card corresponds to the authority information of the first virtual card.

For the above correspondence, for example, when using the virtual card, the current use status is the current use time and current transaction amount if the authority information thereof is the use limit and the use time.

The server finds the corresponding second virtual card according to the identifier of the first virtual card, authenticates the second dynamic password and the use request according to the corresponding second virtual card, and sends an authentication result to the mobile terminal, in order that the mobile terminal performs next step according to the authentication result.

The above second dynamic password may be obtained by the mobile terminal according to the secret key of the first virtual card and a dynamic factor via an encryption algorithm. The dynamic factor may be the current time or the current time with the addition of an identifier which is known to certain frond ends or back ends, for example, transaction amount. Specifically, it may employ a SM3 cryptographic hashing algorithm.

In the present invention, the secret key of the first virtual card corresponds to the secret key of the second virtual card, and the identifier of the first virtual card corresponds to the identifier of the second virtual card. The encryption algorithm used by the mobile terminal to generate the second dynamic password corresponds to the encryption algorithm used by the server to authenticate the second dynamic password. The correspondence in the present invention may refer to the same.

And when authenticating by using the dynamic password, the secret key of the first virtual card and the secret key of the second virtual card are generated in the mobile terminal and the server, respectively, avoiding the network transmission of the secret keys and further improving the security.

It should be noted that, the above authentication also may be by means of a PKI manner. The authentication related to PKI may combined with the prior art.

In another embodiment of the present invention, it is also possible to authorize the generation of a virtual card in another mobile terminal via the virtual card already generated in the mobile terminal. Wherein, the mobile terminal already generating the virtual card corresponds to the above physical card, and in which a first dynamic password and a secret key of the first virtual card are generated. The another mobile terminal corresponds to the mobile terminal in the above-mentioned embodiment. The process of authorization and use is similar to the above-mentioned embodiment, and is not more detailed described herein.

Embodiment 3

Figure 5:
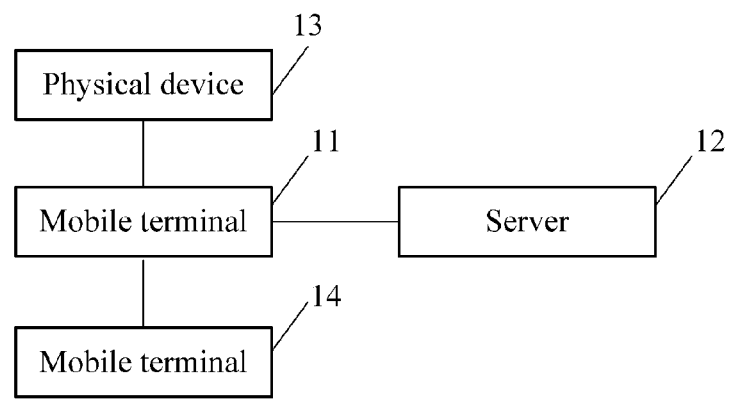
FIG. 5 is a structure diagram of a device of the present invention.

The present invention further provides a device of authorizing and using a virtual device, referring to FIG. 5, the device comprises a mobile terminal 11 and a server 12.

The mobile terminal 11 is installed with a virtual device terminal software.

The mobile terminal 11 is to receive a request for generating a first virtual device sent by a first device and authority information of the first virtual device input by a user, generate an identifier of the first virtual device according to an identifier of the first device, generate the first virtual device according to the identifier of the first virtual device and the authority information of the first virtual device and send a request for generating a second virtual device to the server 12; the request for generating the first virtual device comprises the identifier of the first device and an first authentication information; the request for generating the second virtual device comprises the identifier of the first device, the first authentication information and the authority information of the first virtual device.

The mobile terminal 11 further is to, when receiving a use request input by a user, generate second authentication information, send the use request and the second authentication information to the server 12 and perform next step according to an authentication result returned by the server 12; the use request comprises a current use status of the first virtual device and the identifier of the first virtual device.

The server 12 is to authenticate the first authentication information and the authority information of the first virtual device in the request for generating the second virtual device according to the identifier of the first device, the authority information of the first device and the related authentication information of the first device stored in the server itself; when passing the authentication, to generate an identifier of the second virtual device according to the identifier of the first device, generate the second virtual device according to the identifier of the second virtual device and the authority information of the first virtual device, and associatively store the second virtual device with the first device.

The server 12 is to find a corresponding second virtual device according to the identifier of the first virtual device, authenticate the second authentication information and the use request according to the corresponding second virtual device, and send an authentication result to the mobile terminal 11.

In a specific embodiment of the present invention, the mobile terminal 11 is to interact with a physical device 13, and acquire the request for generating the first virtual device from the physical device 13. In particular, it can be acquired by a manner of manually inputting, NFC reading, blue tooth sending and two-dimension code recognizing, etc. The physical device may in particular be a physical card, such as an entity bank card.

Or the mobile terminal 11 is to communicate with another mobile terminal 14 having generated a third virtual device, and acquire the request for generating the first virtual device from the another mobile terminal 14.

The above mentioned device may authorize the virtual device or authenticate the use of the virtual device by means of a PKI or dynamic password manner.

In another embodiment of the present invention, the mobile terminal 11 and the server 12 complete the authorization generation and the use of the virtual devices by means of dynamic password.

Wherein, the mobile terminal 11 is to receive a request for generating the first virtual device of the first device and the authority information of the first virtual device input by a user, generate the identifier of the first virtual device according to the identifier of the first device, generate the first virtual device according to the identifier of the first virtual device, a secret key of the first virtual device and the authority information of the first virtual device, and send the request for generating the second virtual device to the server; the request for generating the first virtual device comprises the identifier of the first device, the first dynamic password and the secret key of the first virtual device; the first dynamic password is obtained by encrypting the secret key of the first device and a dynamic factor by the first device; the secret key of the first virtual device is obtained by encrypting the secret key of the first device by the first device; the request for generating the second virtual device comprises the identifier of the first device, the first dynamic password and the authority information of the first virtual device.

The mobile terminal 11 further is to, when receiving a use request input by a user, generate a second dynamic password, send the use request and the second dynamic password to the server 12, and perform next step according to an authentication result returned by the server 12. The use request comprises a current use status of the first virtual device and the identifier of the first virtual device; the current use status of the first virtual device corresponds to the authority information of the first virtual device.

The server 12 is to authenticate the first dynamic password and the authority information of the first virtual device in the request for generating the second virtual device according to the identifier of the first device, the authority information of the first device and the secret key of the first device stored in the server itself, and when passing the authentication, to generate an identifier of the second virtual device according to the identifier of the first device, generate the secret key of the second virtual device according to the secret key of the first device, generate the second virtual device according to the identifier of the second virtual device, the secret key of the second virtual device and the authority information of the first virtual device, and associatively store the second virtual device with the first device.

The server 12 is to find a corresponding second virtual device according to the identifier of the first virtual device, authenticate the second dynamic password and the use request according to the corresponding second virtual device, and send an authentication result to the mobile terminal.

Based on the different first devices, the authority information comprises at lease one of time, class and limit, and the current use status of the first virtual device comprise at lease one of current use time, use class and use limit of the first virtual device.

It should be noted that, the embodiments of the device corresponds with the embodiments of the method, and related parts thereof may be refer to each other.

The above specific embodiments further detailed illustrate the purposes, technical schemes and advantages of the present invention, and it should be noted that the above are only specific embodiments of the present invention, those skilled in the art can present invention, various modifications and variations can be made by the person in the art without departing from the spirit and scope of the invention. Thus, the present invention is also intended to encompass those changes and modifications of the present invention which belong to the scope of the claims of the invention and equivalents thereof.

What is claimed is:

1. A method of authorizing and using a virtual device, characterized in that, the method comprises:
   a mobile terminal receives a request for generating a first virtual device sent by a first device, the request for generating the first virtual device comprising an identifier of the first device and a first authentication information; the mobile terminal is installed with a virtual device terminal software;
   the mobile terminal receives authority information of the first virtual device input by a user;
   the mobile terminal generates the first virtual device and a server generates a second virtual device;
   when receiving a use request input by a user, the mobile terminal generates a second authentication information and sends the use request and the second authentication information to the server; the use request comprises a current use status of the first virtual device and an identifier of the first virtual device, and the current use status of the first virtual device comprises at least one of current use time, use class, use limit of the first virtual device, number of use times, use class and the used amount;
   the server finds the corresponding second virtual device according to the identifier of the first virtual device, authenticates the second authentication information and the use request according to the corresponding second virtual device, and sends an authentication result to the mobile terminal;
   wherein,
   the mobile terminal generating the first virtual device comprises: a mobile terminal generates the identifier of the first virtual device according to the identifier of the first device, and generates the first virtual device according to the identifier of the first virtual device and the authority information of the first virtual device, and the authority information of the first virtual device comprises at least one of use time, class, limit, number of times, door types which may be opened by the door access;
   the server generating the second virtual device comprises:
   the server receives a request for generating the second virtual device sent by the mobile terminal; the request for generating the second virtual device comprises the identifier of the first device, the first authentication information and the authority information of the first virtual device, and the server authenticates the first authentication information and the authority information of the first virtual device in the request for generating the second virtual device according to the identifier of the first device, authority information of the first device and related authentication information of the first device stored in the server itself,
   if passing the authentication, the server generates an identifier of the second virtual device according to the identifier of the first device, generates the second virtual device according to the identifier of the second virtual device and the authority information of the first virtual device, and associatively stores the second virtual device with the first device.

2. The method according to claim 1, characterized in that, the mobile terminal receiving the request for generating the first virtual device sent by the first device comprises:
   the mobile terminal interacts with a physical device, and receives the request for generating the first virtual device from the physical device;
   or,
   the mobile terminal communicates with another mobile terminal having generated a third virtual device, and receives the request for generating the first virtual device from the another mobile terminal.

3. The method according to claim 1, characterized in that, the method of authorizing the generation of the virtual device and using the virtual device is authenticated by PKI.

4. The method according to claim 1, characterized in that, the method of authorizing the generation of the virtual device and using the virtual device is authenticated by dynamic password; the method comprises:
   the mobile terminal interacts with the first device to obtain the request for generating the first virtual device comprising the identifier of the first device, a first dynamic password and a secret key of the first virtual device; the first dynamic password is obtained by encrypting a secret key of the first device and a dynamic factor by the first device, the dynamic factor may be the current time or the current time with the addition of an identifier which is known to certain front ends or back ends; the secret key of the first virtual device is obtained by encrypting the secret key of the first device by the first device;
   the mobile terminal receives authority information of the first virtual device input by a user;
   the mobile terminal generates the identifier of the first virtual device according to the identifier of the first device, and generates the first virtual device according to the identifier of the first virtual device, the secret key of the first virtual device and the authority information of the first virtual device;
   the mobile terminal sends the request for generating the second virtual device to the server; the request for generating the first virtual device comprises the identifier of the first device, the first dynamic password and the authority information of the first virtual device;

the server authenticates the first dynamic password and the authority information of the first virtual device in the request for generating the second virtual device according to the identifier of the first device, the authority information of the first device and the secret key of the first device stored in the server itself;

if passing the authentication, the server generates the identifier of the second virtual device according to the identifier of the first device, and encrypted generates the secret key of the second virtual device according to the secret key of the first device;

the server generates the second virtual device according to the identifier of the second virtual device, the secret key of the second virtual device and the authority information of the first virtual device, and associatively stores the second virtual device with the first device;

when receiving a use request input by a user, the mobile terminal generates a second dynamic password according to the secret key of the first virtual device and sends the use request and the second dynamic password to the server; the use request comprises a current use status of the first virtual device and the identifier of the first virtual device; the current use status of the first virtual device corresponds to the authority information of the first virtual device;

the server finds the corresponding second virtual device according to the identifier of the first virtual device, authenticates the second dynamic password and the use request according to the corresponding second virtual device, and sends an authentication result to the mobile terminal.

5. The method according to claim 4, characterized in that, the request for generating the first virtual device further comprises a random code;
the secret key of the first virtual device is generated according to the secret key of the first device and the random code by the first device via a SM3 cryptographic hashing algorithm;
the request for generating the second virtual device further comprises a random code;
if passing the authentication, the server generates the secret key of the second virtual device according to the secret key of the first device and the random code via the SM3 cryptographic hashing algorithm.

6. The method according to claim 1, characterized in that, the authority information comprises at least one of time, class and limit, and the current use status of the first virtual device comprises at least one of current use time, use class and use limit of the first virtual device.

7. A device of authorizing and using a virtual device, characterized in that, the device comprises a mobile terminal and a server;
the mobile terminal is to receive a request for generating a first virtual device sent by a first device and authority information of the first virtual device input by a user, generate an identifier of the first virtual device according to an identifier of the first device, generate the first virtual device according to the identifier of the first virtual device and the authority information of the first virtual device and send a request for generating a second virtual device to the server and the authority information of the first virtual device comprises at least one of use time, class, limit number of times, door types which may be opened by the door access; the request for generating the first virtual device comprises the identifier of the first device and a first authentication information; the mobile terminal is installed with a virtual device terminal software; the request for generating the second virtual device comprises the identifier of the first device, the first authentication information and the authority information of the first virtual device;

the mobile terminal further is to, when receiving a use request input by a user, generate a second authentication information, send the use request and the second authentication information to the server; the use request comprises a current use status of the first virtual device and the identifier of the first virtual device, and the current use status of the first virtual device comprises at least one of current use time, use class, use limit of the first virtual device, number of use times, use class and the used amount;

the server is to authenticate the first authentication information and the authority information of the first virtual device in the request for generating the second virtual device according to the identifier of the first device, the authority information of the first device and the related authentication information of the first device stored in the server itself, and when passing the authentication, to generate an identifier of the second virtual device according to the identifier of the first device, generate the second virtual device according to the identifier of the second virtual device and the authority information of the first virtual device, and associatively store the second virtual device with the first device;

the server is to find a corresponding second virtual device according to the identifier of the first virtual device, authenticate the second authentication information and the use request according to the corresponding second virtual device, and send an authentication result to the mobile terminal.

8. The device according to claim 7, characterized in that, the mobile terminal is to interact with a physical device, and acquire the request for generating the first virtual device from the physical device;
or,
the mobile terminal is to communicate with another mobile terminal having generated a third virtual device, and acquire the request for generating the first virtual device from the another mobile terminal.

9. The device according to claim 7, characterized in that, the mobile terminal and the server complete the authorization generation and the use of the virtual devices by means of PKI.

10. The device according to claim 7, characterized in that, the mobile terminal and the server complete the authorization generation and the use of the virtual devices by means of dynamic password;
the mobile terminal is to receive a request for generating the first virtual device of the first device and the authority information of the first virtual device input by a user, generate the identifier of the first virtual device according to the identifier of the first device, generate the first virtual device according to the identifier of the first virtual device, a secret key of the first virtual device and the authority information of the first virtual device, and send the request for generating the second virtual device to the server; the request for generating the first virtual device comprises the identifier of the first device, the first dynamic password and the secret key of the first virtual device; the first dynamic password is obtained by encrypting a secret key of the first device and a dynamic factor by the first device, the dynamic factor may be the current time or the current time with the addition of an identifier which is known to certain front ends or back ends; the secret key of the first virtual device is obtained by encrypting the secret key of the first device by the first device; the request for generating the second virtual device comprises the identifier of the first device, the first dynamic password and the authority information of the first virtual device;

the mobile terminal further is to, when receiving a use request input by a user, generate a second dynamic password, send the use request and the second dynamic password to the server; the use request comprises a current use status of the first virtual device and the identifier of the first virtual device; the current use status of the first virtual device corresponds to the authority information of the first virtual device;

the server is to authenticate the first dynamic password and the authority information of the first virtual device in the request for generating the second virtual device according to the identifier of the first device, the authority information of the first device and the secret key of the first device stored in the server itself; and when passing the authentication, to generate an identifier of the second virtual device according to the identifier of the first device, generate the second virtual device according to the identifier of the second virtual device, the secret key of the second virtual device and the authority information of the first virtual device, and associatively store the second virtual device with the first device;

the server is further to find a corresponding second virtual device according to the identifier of the first virtual device, authenticate the second dynamic password and the use request according to the corresponding second virtual device, and send an authentication result to the mobile terminal.

11. The device according to claim 7, characterized in that, the authority information comprises at least one of time, class and limit, and the current use status of the first virtual device comprises at least one of current use time, use class and use limit of the first virtual device.

* * * * *